(12) United States Patent
Hsu

(10) Patent No.: US 7,980,689 B2
(45) Date of Patent: Jul. 19, 2011

(54) FLOATING EYEWEAR AND METHOD OF MAKING FLOATING EYEWEAR

(76) Inventor: Wen-Yi Hsu, Rancho Cucamonga, CA (US)

( * ) Notice: Subject to any disclaimer, the term of this patent is extended or adjusted under 35 U.S.C. 154(b) by 517 days.

(21) Appl. No.: 11/880,247

(22) Filed: Jul. 20, 2007

(65) Prior Publication Data
US 2009/0021688 A1 Jan. 22, 2009

(51) Int. Cl.
G02C 1/00 (2006.01)
(52) U.S. Cl. .......................................................... 351/43
(58) Field of Classification Search .................... 351/43, 351/41, 83, 86, 103, 106, 111, 121, 158
See application file for complete search history.

(56) References Cited

U.S. PATENT DOCUMENTS

| 4,966,451 | A |  | 10/1990 | Corral et al. |
| 5,019,000 | A |  | 5/1991 | Stephens |
| 5,235,355 | A |  | 8/1993 | May |
| 5,245,709 | A |  | 9/1993 | Shipcott |
| 5,299,588 | A |  | 4/1994 | MacLeod |
| 5,309,577 | A |  | 5/1994 | Buononato et al. |
| 5,495,303 | A |  | 2/1996 | Kolentsi |
| 5,631,716 | A | * | 5/1997 | Chao ............................... 351/41 |
| 6,059,408 | A |  | 5/2000 | Bonacci |
| 6,513,925 | B1 |  | 2/2003 | Bonacci |
| 6,860,596 | B1 |  | 3/2005 | Nolan |
| 7,004,580 | B2 | * | 2/2006 | Jackson et al. ................... 351/86 |
| 2004/0156011 | A1 |  | 8/2004 | David |
| 2005/0088613 | A1 |  | 4/2005 | Jackson et al. |
| 2005/0144707 | A1 |  | 7/2005 | Chen |
| 2005/0280773 | A1 |  | 12/2005 | Bent |
| 2006/0055868 | A1 |  | 3/2006 | Lee |

* cited by examiner

Primary Examiner — Hung X Dang
(74) Attorney, Agent, or Firm — Alexander Chen, Esq.

(57) ABSTRACT

Eyewear, and more particularly floating eyewear such as eyeglasses and/or sunglasses may include a frame, temples, and lenses wherein the frame and/or temples may be formed form the combination of a blowing agent and a polymer so as to render the eyewear floating. A method for making floating eyewear is also contemplated wherein a heat-activated blowing agent is dry-blended with a plastic resin to form a mixture which is loaded into a hopper coupled to a cylinder, after which the mixture is heated to a molten form, injected into a mold, cooled, and then later ejected from the mold.

28 Claims, 3 Drawing Sheets

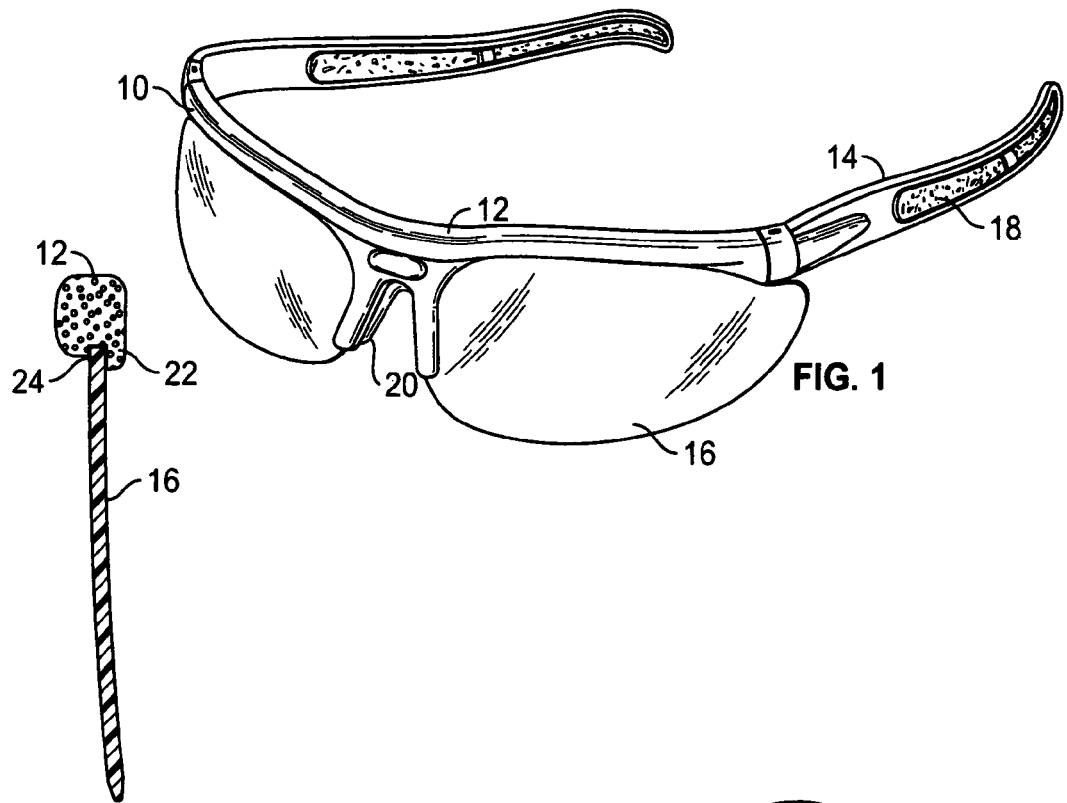
FIG. 1
FIG. 2
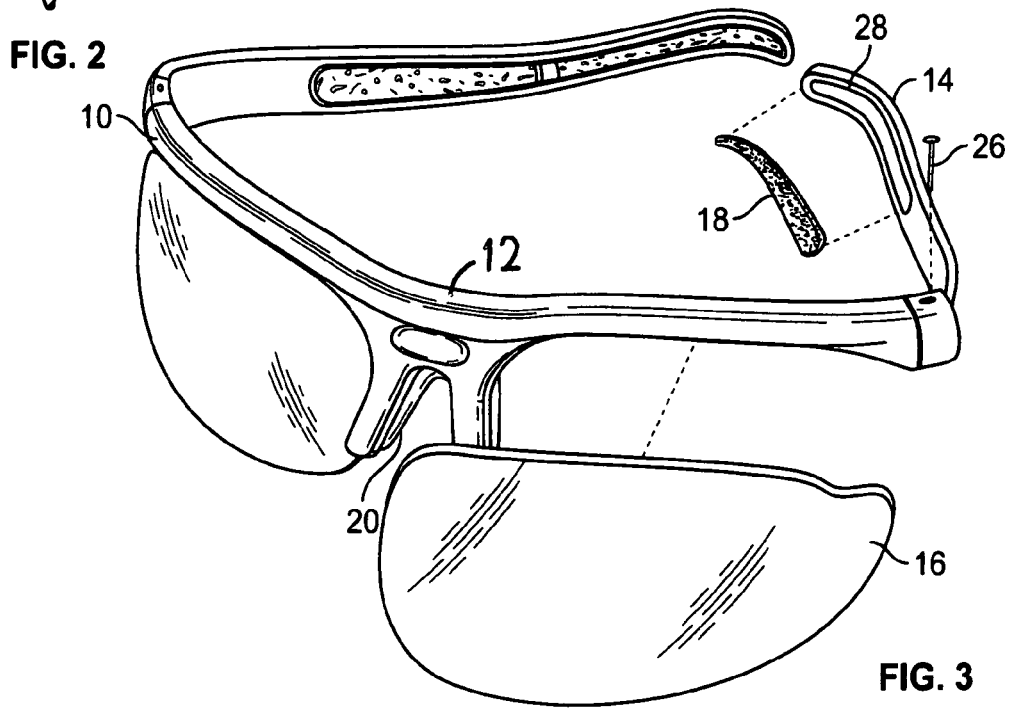
FIG. 3

FLOATING EYEWEAR AND METHOD OF MAKING FLOATING EYEWEAR

FIELD OF THE INVENTION

This invention is generally related to eyewear, and more particularly to floating eyewear such as glasses and a method of making floating eyewear.

BACKGROUND OF THE INVENTION

One problem for people who wear glasses and participate in water sports is the ever-present danger that their glasses will fall into the water and become irretrievably lost. Some people must wear eyeglasses with prescription lenses to correct defective vision while others wear eyeglasses with tinted lenses, such as sunglasses for reducing eyestrain by shading the ambient light and by cutting the glare of the sun on a body of water. In either example, the construction and material of the glasses may make them such that they will sink into the water should they fall off. For example, traditional glasses made from metal and plastic usually do not float because the density of the materials makes the glasses denser than water (approximately 1.0 g/cc). Glasses are therefore frequently lost from boats, piers and docks after they fall into the water. Children's prescription eyeglasses and sunglasses are particularly susceptible to being lost in the water as children are often less conscientious then adults. The expense and inconvenience of replacing glasses whether they are for adults or children may be considerable, both for prescription and non-prescription versions.

Eyewear, including, but not limited to, glasses such as prescription eyeglasses and sunglasses, may be configured to float to avoid the aforementioned problems. Floating glasses may be useful in connection with activities including fishing, boating, waterskiing and windsurfing among other water sports where it is desirable to have eyewear that will not sink in water. One prior method of making floating glasses includes attaching lightweight foam or sponge to components of the glasses including the frame or the temples to lower the overall density. However, attaching foam to the exterior surface of the glasses may make them bulky, unattractive, and/or uncomfortable. In some cases, the foam may contact and irritate the user's skin. Furthermore, the process of attaching foam or sponge material to the glasses may unnecessarily complicate and increase the cost of production.

Another method of creating floating glasses includes hollowing out the components including the frame and temples to lower the overall density of the glasses. However, hollowing out these components may detrimentally impact the structural integrity of the glasses and may make the glasses brittle or too flexible. Furthermore, the surface area of the hollowed-out structure may need to be so large that the glasses become unattractive and/or uncomfortable. Another method of making floating glasses may be to use lightweight bendable material that floats. However, this type of eyewear may deform and not hold its shape. In addition, such bendable material may be more difficult to mold.

It is therefore an object of the invention to provide floating eyewear and a method of making floating eyewear, which avoids the problems associated with current eyewear.

SUMMARY OF THE INVENTION

Floating eyewear may be in the form of glasses including but not limited to prescription eyeglasses and sunglasses and may include a frame, a pair of temples, and a pair of lenses coupled within the frame. A nosepiece may also be coupled to the frame, allowing the glasses to comfortably rest on a wearer. The frame may be formed of a closed-cell composition comprising a combination of a blowing agent and a plastic such that the frame has a substantially uniform density. The temples may also be formed of the same or different closed-cell composition, and also may have a substantially uniform density. By floating, the glasses may be configured to lie on the surface of, partially on the surface of, or slightly below the surface of water, such that the glasses are reasonably retrievable should they fall in the water.

The temples, frame, and other components of the glasses including but not limited to a nosepiece, may all be formed of a closed-cell composition or in the alternative, one or more of the aforementioned components may be formed of a closed cell composition, or the aforementioned components may be formed of a combination of closed-cell composition and denser materials, so long as the glasses as a whole have a suitable density for floating. A closed cell composition or foam has cell walls which are mostly not broken, and which form bubbles that are relatively air tight. For example, the frame may be formed of a closed-cell composition while the temples may be formed of a conventional plastic or metal material. The temples and the frame may also be formed with or without substantially uniform densities. For example, the temples may be formed with cavities therein for accepting other materials such as cork or a cork composite or the temples may be formed with cavities therein which do not contain any material. The frame may be similarly formed, so long as the overall density of the glasses is suitable for floating.

The frame and temples may have shape-memory properties so that the glasses are bendable, yet return to their original configuration after the bending force is released. The frame may also have slotted receptors therein to house the lenses. The slotted receptors may be such that they accept the lenses by an interference fit within the frame. In this case, the strength of the frame must be such that it is capable of securely coupling the lenses through the interference fit.

The temples may be pivotally coupled to the frame and secured to the frame via threaded fasteners such as screws passing through overlapping portions of the temples and the frame. The strength of the frame should be such that it is capable of accepting the screws in a removably secure manner. Furthermore, a nosepiece may be coupled to the frame to allow the sunglasses to comfortably rest on a wearer.

Alternatively, the frame and temples may be formed as one piece or in other alternative configurations. In the case that the frame and temples are formed as a one-piece unit, the unit may have a substantially uniform density suitable for floating due to the closed-cell composition. Similarly, the lenses may consist of two or more separate lenses or may consist of the left and right portions of a single piece of material, as dictated by design requirements. Various other well-known accessories may be coupled to the sunglasses without departing from the scope of the invention such as nosepieces and leashes.

The closed-cell composition described above has a suitable density for floating and incorporates a plurality of bubbles therein. There are several materials that may be used to form the compositions and the resulting bubbles therein. The bubbles may be arranged such that they reduce the overall density of the individual components of the glasses, such as the frame and temples when compared to a solid counterpart, however the glasses should retain the strength necessary to endure typical consumer use.

The bubbles help to provide the components of the glasses with a density low enough to float on water. A blowing agent may produce or help form the bubbles in the composition. The bubbles may be substantially closed to prevent fluid absorption and air penetration and also to make the composition suitable for sustained floatation. In general, when compared to open-cell foams, closed-cell foams such as the ones contemplated herein have higher dimensional stability, lower moisture absorption and higher strength due to their closed-cell structures. Most of the bubbles in the composition may not be broken and may resemble inflated balloons or soccer balls, piled together in a compact configuration. This makes the composition strong and reasonably rigid.

The bubble size can be varied to comply with requirements including, but not limited to, density, structural integrity, and rigidity. The bubble shape may also vary from bubble to bubble. For instance, the bubbles may take the form of spherical bodies, substantially spherical bodies, oblong bodies, and other shapes that may arise within the closed-cell composition. The bubbles may be randomly or substantially uniformly dispersed within the composition and the size and number of bubbles may be varied as necessary. Several attributes of the bubbles may be completely or partially controlled by a process of forming the glasses. In one instance, the size and arrangement of the bubbles may be controlled at least partially by controlling an injection molding process. In addition, the plastic in the composition can be selected from several types of plastics to give the composition different physical properties. Similarly, the blowing agent may be selected from several types of blowing agents depending on specification.

The aforementioned closed-cell composition comprises mixtures of plastics and blowing agents wherein the ratio of plastic to blowing agent may range from 95:5 to 99.35:0.65. The plastic for each closed-cell composition may include a material selected from the group consisting of: polyurethane ("PU"), thermoplastic polyurethane ("TPU"), polycarbonate ("PC"), polyamide ("PA"), cellulose acetate butyrate ("CAB"), and cellulose acetate propionate ("CAP"). The blowing agent for each closed-cell composition may be selected from the group consisting of Treibmittel ("Lifobatch") Z 1000, produced by Horst Muller Kunststoffe GmbH of Germany and Tracel IM 2240 ST and Tracel IM 3170 MS, both produced by Tramaco GmbH of Germany.

As to the lenses, they may be formed from a material selected from the group consisting of: polycarbonate ("PC"), tri-acetyl cellulose ("TAC"), polymethyl methacrylate ("PMMA"), polyamide ("PA"), cellulose acetate butyrate ("CAB"), and polyurethane ("PU"). The lenses may also be formed from a material selected from the group consisting of: polarized polycarbonate ("PC"), polarized tri-acetyl cellulose ("TAC"), polarized polymethyl methacrylate ("PMMA"), polarized polyamide ("PA"), polarized cellulose acetate butyrate ("CAB"), and polarized polyurethane ("PU").

Additional flotation materials with suitable floating densities may be incorporated into the sunglasses. In particular, the temples may have cork, a cork composite, or a cork substitute placed within the temples to decrease overall density. In at least one instance, the temples may be formed with openings therein for the placement of the additional flotation material. Parts of the frame and nosepiece may also have floatation material placed therein in the same or similar manners. A cork composite may include a mixture of plastic and cork wherein the ratio of plastic to cork may range from 70:30 to 99:1. The plastic may be selected from the group consisting of: polyurethane ("PU") and thermoplastic polyurethane ("TPU"). In combination with or instead or the cork, alternative floatation materials including, but not limited to, EVA sponge, silicone sponge, and vinyl sponge may similarly be incorporated into components of the glasses to decrease the overall density.

A method of making floating eyewear components including the frame and temples of glasses may include injection molding. In one instance, a heat activated blowing agent may be dry-blended with a plastic resin to form a mixture. The mixture may be loaded into a cylinder and turned molten. The molten mixture may be activated and injected into a mold. A nozzle within the cylinder may be shut off and the mixture may activate in the mold. The mixture may then be compressed into the mold. The resultant form may be cooled, separated, and ejected from the mold in accordance with well-known techniques.

The glasses may incorporate a flexible insert within the frame and/or the temples, the insert configured to interface with the wearer to make the glasses more comfortable. In the frame, the insert may be configured in the center, bridge portion that contacts a wearer's forehead to provide additional comfort. The insert may be co-injected into the frame and/or temple molds at the time of molding, or inserted into the frame and/or temples after molding. The insert may be formed from materials including, but not limited to, PU, TPU and PA and may be combined with or without a blowing agent.

The glasses may also incorporate a separate, possibly denser, material within the hinged area comprising the frame and temple coupling. As this coupling is subject to repetitive movement, greater strength may be achieved by substituting the closed-cell composition for a denser plastic material. Similar to the aforementioned flexible insert, this hinged-area insert may be co-injected into the frame and/or temple molds at the time of molding, or inserted into the frame and/or temples after molding.

BRIEF DESCRIPTION OF THE DRAWINGS

The invention is generally shown by way of reference to the accompanying drawings in which:

FIG. 1 is a perspective view of sunglasses having a frame, temples, a nosepiece, and curved lenses;

FIG. 2 is an enlarged cross-sectional view of a sunglass frame having bubbles therein;

FIG. 3 is a cut-away view of sunglasses temples having cork-composite therein;

DETAILED DESCRIPTION OF THE INVENTION

Figure 4:
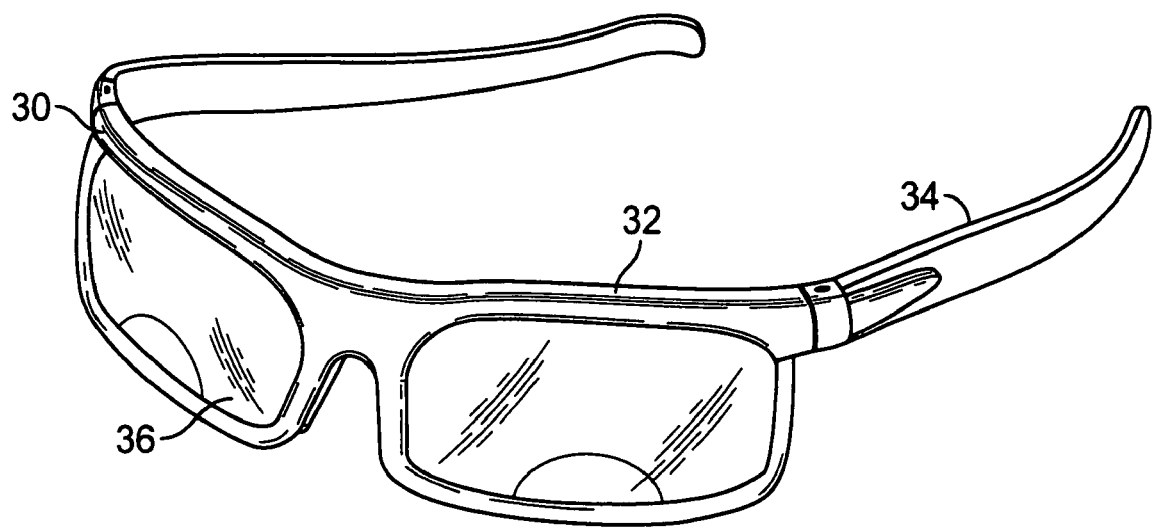
FIG. 4 is a perspective view of prescription eyeglasses having a frame, temples, and curved lenses.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

As shown in FIG. 1, sunglasses 10 include an arced frame 12, a pair of temples 14, and a pair of lenses 16 coupled within the frame. The frame and temples are injection-molded, each formed of a closed-cell composition comprised of a combination of a plastic and a blowing agent. The closed-cell composition provides the frame and temples with densities sufficient for floating. The plastics and blowing agents are mixed such that the ratio of plastic to blowing agent may range from 95:5 to 99.35:0.65. In this embodiment, the plastic used in the frame and temples is thermoplastic polyurethane ("TPU") and the blowing agent is Tracel IM 2240 ST, produced by Tramaco GmbH of Germany. In one embodiment, the ratio is approximately 99 parts TPU to 1 part Tracel IM 2240 ST.

In other embodiments, the plastic may be selected from the group including, but not limited to, polyurethane ("PU"), polycarbonate ("PC"), polyamide ("PA"), cellulose acetate butyrate ("CAB"), and cellulose acetate propionate ("CAP") while the blowing agent may be selected from materials including, but not limited to, Treibmittel ("Lifobatch") Z 1000, produced by Horst Muller Kunststoffe GmbH of Germany and Tracel IM 3170 MS, produced by Tramaco GmbH of Germany. It will be understood that other plastics and blowing agents can be substituted without departing from the scope of the invention.

To further increase buoyancy, the temples have slotted openings 28 (shown in FIG. 3) therein for accepting a cork composite 18. The cork composite is configured to be flexible while not irritating the wearer's skin. The sunglasses 10 are configured such that when the frame 12 and temples 14 are used in connection with the lenses 16 and a nosepiece 20, the sunglasses as a whole have an overall density low enough for floating.

Referring back to FIG. 1, the frame 12 and temples 14 and other components of the glasses including, but not limited to, the nosepiece 20, may all be formed of a closed-cell composition or in the alternative, one or more of the aforementioned components may be formed of a closed cell composition, so long as the glasses have an overall floating density. For example, the frame may be formed of a closed-cell composition while the temples may be formed of a conventional plastic or metal material. In another embodiment, different components of the sunglasses may be formed from different closed-cell compositions, so long as the sunglasses have an overall floating density.

As shown in FIG. 2, the cross-section of the frame 12 displays bubbles 22, which occupy significant portions of the cross-sectional area of the closed-cell composition and the corresponding frame and temples of the sunglasses. The bubbles may each be between approximately 0.001 mm and 0.07 mm in diameter depending on several factors including the types of plastics and blowing agents as well as the conditions and processes used to mold the frame and temples. The bubbles may be substantially closed to prevent fluid absorption and air penetration and also to make the composition suitable for sustained floatation. Most of the bubbles in the composition may be unbroken and may resemble inflated balloons or soccer balls, piled together in a compact configuration. This makes the composition strong and reasonably rigid. The bubbles enclose a gas, which is lighter than the surrounding plastic, thus providing a material that is lighter than a solid plastic or metallic counterpart and provide the frame and temples with a sufficiently low density such that the sunglasses may float, i.e. either at or slightly below the surface of the water.

The bubble size and the closed cell composition properties can be varied to comply with requirements including, but not limited to, density, structural integrity, and rigidity. The bubbles 22 may be randomly or substantially uniformly dispersed within the composition and the size and number of bubbles may be varied as necessary. Several attributes of the bubbles may be completely or partially controlled by a process of forming the glasses. In one instance, the size and arrangement of the bubbles may be controlled at least partially by controlling an injection molding process. For example, in the case of injection molding the frame or the temples, after the plastic and blowing agent mixture is injected into the mold, the material may be compressed into the mold, resulting in a more uniform distribution of bubbles, which may be smaller than prior to compression. In addition, the plastic in the composition can be selected from several types of plastics to give the composition different physical properties. Similarly, the blowing agent may be selected from several types of blowing agents depending on specification.

Referring still to FIG. 2, the frame 12 retains the lens 16 through a slotted receptor 24, which provides a slotted fitting. In addition to this fitting, the lenses are coupled within the frame through an interference fit, such that no glue or other adhesive material is required to retain the lenses in the frame. The resiliency of the closed cell composition helps make this interference fit possible. As to the lenses, they are formed from polarized polyamide ("PA") in this embodiment.

In other embodiments, the lenses may be formed from a material selected from the group consisting of: polycarbonate ("PC"), tri-acetyl cellulose ("TAC"), polymethyl methacrylate ("PMMA"), polyamide ("PA"), cellulose acetate butyrate ("CAB"), and polyurethane ("PU"). In addition, the lenses may be formed from a material selected from the group consisting of: polarized polycarbonate ("PC"), polarized tri-acetyl cellulose ("TAC"), polarized polymethyl methacrylate ("PMMA"), polarized cellulose acetate butyrate ("CAB"), and polarized polyurethane ("PU"). In other embodiments, the lenses may also be fitted in different manners and formed from different materials, including, but not limited to, glass. In one such embodiment, the lenses may be coupled to the frame with an adhesive and may be coupled to the frame without an interference fit, so long as they are secured to frame.

As shown in FIG. 3, the temples 14 are pivotally coupled to the frame 12 by threaded fasteners 26 and the lenses 16 are coupled within the frame through slotted receptors 24 (shown in FIG. 2) in an interference fit. To assemble the lenses into the frame, the lenses are slightly compressed and the frame is slightly bent. After the lens is inserted into the frame, both the frame and the lens exert pressure on each other due to the interference fit. This interference fit along, with the slotted receptors of the frame, securely couples the lenses to the frame.

Comprised of a closed-cell composition in this embodiment, the frame is rigid enough to interferingly secure the lenses 16 therein without permanent deformation, yet pliant enough to bend back from typical bending motions, such as insertion and removal of the lenses. The closed cell composition comprising the frame is strong enough such that the threaded fasteners 26 can securely couple the frame with temples 14 without the risk that the threaded fasteners will pull out of the material. The resiliency of the closed cell composition also provides the frame and temples and thus sunglasses as a whole, with shape-memory properties such that the sunglasses bend back to their original configuration after being bent or dropped, much like conventional sunglasses. This property also helps to keep the sunglasses on the user's head while performing sporting activities.

Referring still to FIG. 3, the temples 14 have a cork composite 18 inserted therein, which enhances the buoyancy of the temples and thus of the sunglasses 10 as a whole. Similar to how the lenses 16 are interferingly fit within the frame 12, the cork-composite filling is interferingly fitted in slotted receptors 28 within the temples. While no glue is needed to keep the cork composite fillings within the temples, glue may be used for a more secure fit. Additional flotation materials may be incorporated into the sunglasses. In addition to a cork composite, cork or a cork substitute may also be placed within the temples to decrease overall density. Parts of the frame and nosepiece may also have floatation materials placed therein or thereon in the same or similar manners to increase the buoyancy of the glasses.

The cork composite includes a mixture of at least plastic and cork wherein the ratio of plastic to cork may range from 70:30 to 99:1. The plastic may be selected from the group consisting of: polyurethane ("PU") and thermoplastic polyurethane ("TPU"). In this embodiment, the cork composite consists of approximately 80 parts TPU to 20 parts cork. In combination with or instead of the cork, alternative floatation materials including, but not limited to, EVA sponge, silicone sponge, and vinyl sponge may similarly be incorporated into components of the sunglasses to decrease the overall density. Furthermore, other components of the sunglasses 10 including, but not limited to, the frame 12 and nosepiece 20 may incorporate a cork-composite, or similar material as mentioned above therein. For instance, the frame may be configured similar to the temples 14, with slots therein for accepting the cork-composite or a similar material that may enhance the buoyancy or the appearance of the sunglasses.

Alternatively, a frame and a corresponding pair of temples may be formed as one piece or in other alternative configurations. In the case where the frame and temples are formed as a one-piece unit, the unit may have a substantially uniform density sufficient for floating. Similarly, the lenses may consist of only one lens, for example one lens spanning the length of the frame, or more than one lens as dictated by specification. Various other well-known accessories may be coupled to the sunglasses without departing from the scope of the invention such as different nosepieces, lenses and leashes. The frame and temples as well as the lenses may also be configured for a variety of specific activities including, but not limited to, skiing, boating, and hunting. Where the glasses are configured for hunting, the frame, temples, and the lenses may be coated with a camouflage pattern to disguise the wearer. Other activity-specific configurations are contemplated without departing from the scope of the invention.

As shown in FIG. 4, a pair of prescription eyeglasses 30 having a frame 32, temples 34, and lenses 36 is configured for floating. The frame in this embodiment encloses the lenses and thus contains more material generally than the frame shown in FIGS. 1-3. Similar to FIGS. 1-3 however, the lenses press into the frame and the temples are pivotally coupled to the frame through threaded fasteners (not shown). Also similar, the frame and temples incorporate shape-memory properties such that after being bent or dropped, the prescription eyeglasses will substantially return to their original configuration so that they may again conformably rest upon a wearer's head.

Figure 5:
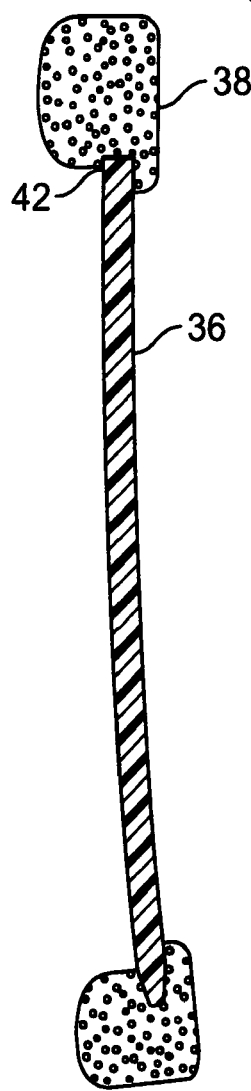
FIG. 5 is an enlarged cross-sectional view of a prescription eyeglass frame having bubbles therein.

Still referring to FIG. 4, both the frame 32 and temples 34 are formed from a closed-cell composition. The closed-cell composition may be similar to or the same as that used in the sunglasses shown in FIGS. 1-3. In one embodiment rather than incorporating cork, the temples of the prescription eyeglasses 30 have uniform cross-sections similar to the frame. As shown in FIG. 5, bubbles 38 within the frame (and temples) provide the prescription eyeglasses with buoyancy so that they may float on water. Similar to the sunglasses in FIGS. 1-3, these prescription sunglasses have slotted receptors 42 within the frame such that the lenses 36 interferingly fit within the frame. Again, the closed cell composition provides the frame with enough rigidity to securely couple the lenses therein. The lenses may be formed from conventional, prescription eyeglass-appropriate material, so long as the overall density of the prescription eyeglasses is sufficient for floating.

Figure 6:
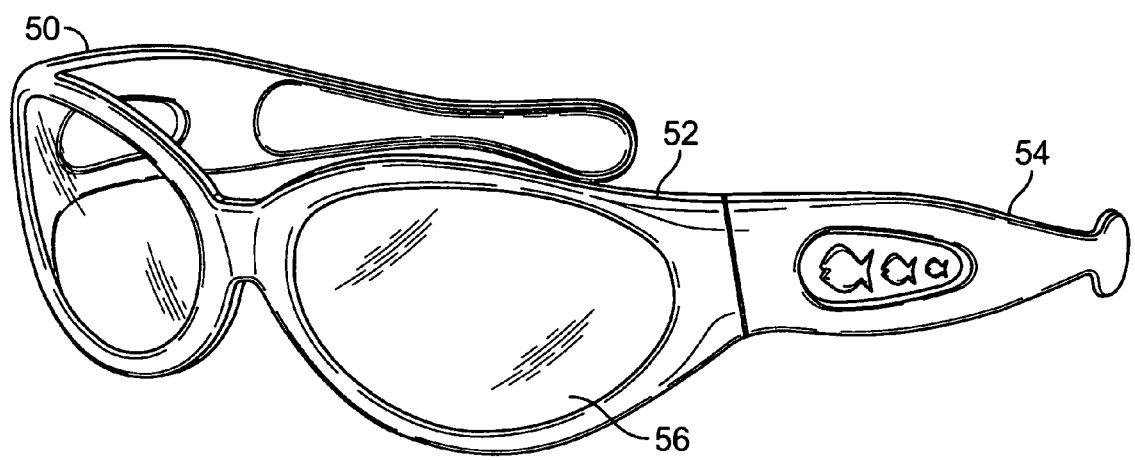
FIG. 6 is a perspective view of children's sunglasses having a frame, temples, and curved lenses.

As shown in FIG. 6, a pair of children's sunglasses 50 have an arced frame 52, pivotally coupled temples 54, and lenses 56 snapped therein. As in FIGS. 1-5, the sunglasses are configured with a closed-cell composition. The frame in this embodiment encloses the lenses, and similar to FIGS. 1-5, the lenses press into the frame in an interference fit. Also, similar, the frame and temples incorporate shape-memory properties such that after being bent or dropped, the children's sunglasses will substantially return to their original configuration so that they may again conformably rest upon a child's head.

Figure 7:
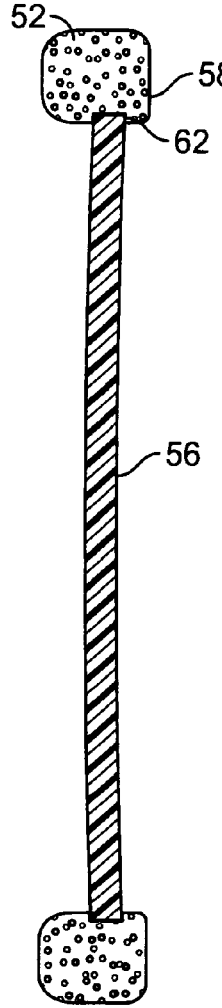
FIG. 7 is an enlarged cross-sectional view of a child's sunglass frame having bubbles therein.

Still referring to FIG. 6, the frame 52 and temples 54 are both formed from a closed-cell composition providing the sunglasses with buoyancy. The closed-cell composition may be similar to or the same as that used in the sunglasses shown in FIGS. 1-5. In one embodiment rather than incorporating cork, the temples of the children's sunglasses 50 have uniform cross-sections similar to the frame. As shown in FIG. 7, bubbles 58 within the frame (and temples) provide the children's sunglasses with buoyancy so that they may float on water. Similar to the sunglasses in FIGS. 1-5, these children's sunglasses have slotted receptors 62 within the frame such that the lenses 56 interferingly fit within the frame. Again, the closed cell composition provides the frame with enough rigidity to securely couple the lenses therein. The lenses may be formed from similar materials to those used in FIGS. 1-3, so long as the overall density of the children's sunglasses is sufficient for floating.

In one method of making eyewear of the present invention, the frame and temples are injection molded. First, heat-activated blowing agent Tracel IM 2240 ST is dry-blended with thermoplastic polyurethane ("TPU") in the ratio of 1 part blowing agent to 99 parts plastic to form a mixture. The mixture of plastic and blowing agent is placed into a cylinder and turned molten. The molten mixture then activates and is injected into injection molds for the frame and temples. The frame and temples may be molded at the same or at different times. In one embodiment the frame and temples are molded at the same time. A nozzle within the cylinder is then shut off and the mixture activates within the mold. The mixture is then compressed into the mold to more evenly distribute the bubbles and create more uniform cross-sections within the frame and temples. In some instances, the bubble size may also be reduced. This compression tends to create stronger frames and temples that resist bending and exhibit greater elasticity. The resultant injection molded frames and temples are then cooled, separated, and ejected from the mold in accordance with well-known techniques. Afterwards, the frames and temples are finish processed and coupled together. Thereafter, lenses are inserted into the frame in an interference fit.

In a further embodiment, the glasses may incorporate a flexible insert within the frame and/or the temples, the insert configured to interface with the wearer to make the glasses more comfortable. In the frame, the insert may be configured in the center, bridge portion that contact a wearer's forehead to provide additional comfort. The insert may be co-injected into the frame and/or temple molds at the time of molding, or inserted into the frame and/or temples after molding. The insert may be formed from materials including, but not limited to, PU, TPU and PA and may be combined with or without a blowing agent.

The glasses may also incorporate a separate, possibly denser, material within the hinged area comprising the frame and temple coupling. As this coupling is subject to repetitive movement, greater strength may be achieved by substituting the closed-cell composition for a denser plastic material. Similar to the aforementioned flexible insert, this hinged-area insert may be co-injected into the frame and/or temple molds at the time of molding, or inserted into the frame and/or temples after molding.

Although the present invention has been described by way of example with references to the drawings, it is to be noted herein that various changes and modifications will be apparent to those skilled in the art. Therefore, unless such changes and modifications depart from the scope of the present invention, they should be construed as being included therein.

What is claimed is:

1. Floating eyeglasses comprising:
a shape-memory elongate frame having slotted receptors therein, the frame comprised of a closed-cell composition, and having a density sufficient for floating;
two shape-memory temples pivotally coupled to the frame, the temples comprised of a closed-cell composition, and having a density sufficient for floating; and
two lenses coupled within the slotted receptors of the elongate frame;
wherein the eyeglasses have an overall density sufficient for floating.

2. The floating eyeglasses of claim 1, wherein:
the temples and the frame are formed from the same closed-cell composition.

3. The floating eyeglasses of claim 1, wherein:
the temples are formed from a first closed-cell composition and the frame is formed from a second closed-cell composition.

4. The floating eyeglasses of claim 1, wherein:
the closed-cell compositions of the frame and the temples comprise mixtures of plastics and blowing agents wherein the ratio of plastic to blowing agent ranges from 95:5 to 99.35:0.65.

5. The floating eyeglasses of claim 4, wherein:
the plastic for each closed-cell composition comprises a material selected from the group consisting of: polyurethane, thermoplastic polyurethane, polycarbonate, polyamide, cellulose acetate butyrate, and cellulose acetate propionate.

6. The floating eyeglasses of claim 4, wherein:
the blowing agent for each closed-cell composition is selected from the group consisting of Treibmittel ("Lifobatch") Z 1000, Tracel IM 2240 ST, and Tracel IM 3170 MS.

7. The floating eyeglasses of claim 1, wherein:
the lenses comprise a material selected from the group consisting of: polycarbonate, tri-acetyl cellulose, polymethyl methacrylate, polyamide, cellulose acetate butyrate, and polyurethane.

8. The floating eyeglasses of claim 1, wherein:
the lenses comprise a material selected from the group consisting of: polarized polycarbonate, polarized tri-acetyl cellulose, polarized polymethyl methacrylate, polarized polyamide, polarized cellulose acetate butyrate, and polarized polyurethane.

9. The floating eyeglasses of claim 1, wherein:
openings are formed within the temples; and
cork composite material is placed within the openings;
wherein the cork composite material has a density sufficient for floating.

10. The floating eyeglasses of claim 9, wherein:
the cork composite material comprises a mixture of plastic and cork wherein the ratio of plastic to cork ranges from 70:30 to 99:1.

11. The floating eyeglasses of claim 10, wherein:
the plastic for the cork composite material is selected from the group consisting of: polyurethane and thermoplastic polyurethane.

12. The floating eyeglasses of claim 1, wherein:
the frame and temples are decorated in camouflage patterns.

13. The floating eyeglasses of claim 1, wherein:
the temples are pivotally coupled to the frame with threaded fasteners.

14. The floating eyeglasses of claim 1, wherein:
the temples are formed with a flexible insert therein.

15. The floating eyeglasses of claim 1, wherein:
the frame is formed with a flexible insert in a center portion of the frame.

16. The floating eyeglasses of claim 1, wherein:
the frame further comprises a material denser than the closed-cell composition of the frame; and
the temples further comprise a material denser than the closed-cell composition of the temples.

17. Floating eyeglasses comprising:
a substantially rigid yet flexible elongate frame having receptors therein, the frame formed of a first closed-cell composition comprising a mixture of plastic and blowing agent wherein the ratio of plastic to blowing agent ranges from 95:5 to 99.35:0.65, the first composition having a density sufficient for floating;
two substantially rigid yet flexible elongate temples coupled to the frame, the temples formed of a second closed-cell composition comprising a mixture of plastic and blowing agent wherein the ratio of plastic to blowing agent ranges from 95:5 to 99.35:0.65, the second composition having a density sufficient for floating; and
two lenses interferingly coupled with the receptors of the elongate frame;
wherein the eyeglasses have an overall density sufficient for floating.

18. The floating eyeglasses of claim 17, wherein:
the elongate frame has a plurality of bubbles therein; and
the temples have a plurality of bubbles therein.

19. The floating eyeglasses of claim 17, wherein:
the elongate frame and the temples have shape memory properties.

20. The floating eyeglasses of claim 17, wherein:
the plastic for each closed-cell composition comprises a material selected from the group consisting of: polyurethane, thermoplastic polyurethane, polycarbonate, polyamide, cellulose acetate butyrate, and cellulose acetate propionate.

21. The floating eyeglasses of claim 17, wherein:
the blowing agent for each closed-cell composition is selected from the group consisting of Treibmittel ("Lifobatch") Z 1000, Tracel IM 2240 ST, and Tracel IM 3170 MS.

22. Floating eyeglasses comprising:
a one-piece elongate arced frame having receptors therein, the frame formed of a closed-cell composition comprising plastic and a blowing agent;
two arced temples coupled to the frame, the temples formed of a closed-cell composition comprising plastic and a blowing agent; and
two plastic lenses interferingly coupled with the receptors of the elongate frame;
wherein the eyeglasses float.

23. The floating eyeglasses of claim 22, wherein:
the elongate frame has a plurality of bubbles uniformly distributed therein; and
the temples have a plurality of bubbles uniformly distributed therein.

24. The floating eyeglasses of claim 22, wherein:
the elongate frame and the temples have shape memory properties.

25. The floating eyeglasses of claim 22, wherein:
the plastic for each closed-cell composition comprises a material selected from the group consisting of: polyurethane, thermoplastic polyurethane, polycarbonate, polyamide, cellulose acetate butyrate, and cellulose acetate propionate.

26. The floating eyeglasses of claim 22, wherein:
the blowing agent for each closed-cell composition is selected from the group consisting of Treibmittel ("Lifobatch") Z 1000, Tracel IM 2240 ST, and Tracel IM 3170 MS.

27. Eyeglasses comprising:
a shape-memory elongate frame which includes a closed-cell composition and a slotted receptor;
a lens coupled to the slotted receptor; and
two shape-memory temples which include a closed-cell composition, the temples pivotally coupled to the frame;
wherein the overall density of the eyeglasses is such that the eyeglasses will sink less than five feet below the surface of water.

28. Eyeglasses comprising:
a shape-memory elongate frame which includes a closed-cell composition and a slotted receptor;
a lens coupled to the slotted receptor; and
two shape-memory temples which include a closed-cell composition, the temples pivotally coupled to the frame;
wherein the lens comprises a material selected from the group consisting of: polycarbonate, tri-acetyl cellulose, polymethyl methacrylate, polyamide, cellulose acetate butyrate, and polyurethane;
wherein each closed-cell composition comprises a plastic and a blowing agent, the ratio of plastic to blowing agent ranging from 95:5 to 99.35:0.65, the plastic selected from the group consisting of: polyurethane, thermoplastic polyurethane, polycarbonate, polyamide, cellulose acetate butyrate, and cellulose acetate propionate, and the blowing agent selected from the group consisting of Treibmittel ("Lifobatch") Z 1000, Tracel IM 2240 ST, and Tracel IM 3170 MS;
wherein the overall density of the eyeglasses is such that the eyeglasses will sink less than five feet below the surface of water.

\* \* \* \* \*